June 1, 1943.  E. A. ZETTERQUIST  2,320,398
COOLING HIGH TEMPERATURE BOLTING
Filed Aug. 30, 1941  3 Sheets-Sheet 1

INVENTOR
ERIC A. ZETTERQUIST.
BY
ATTORNEY

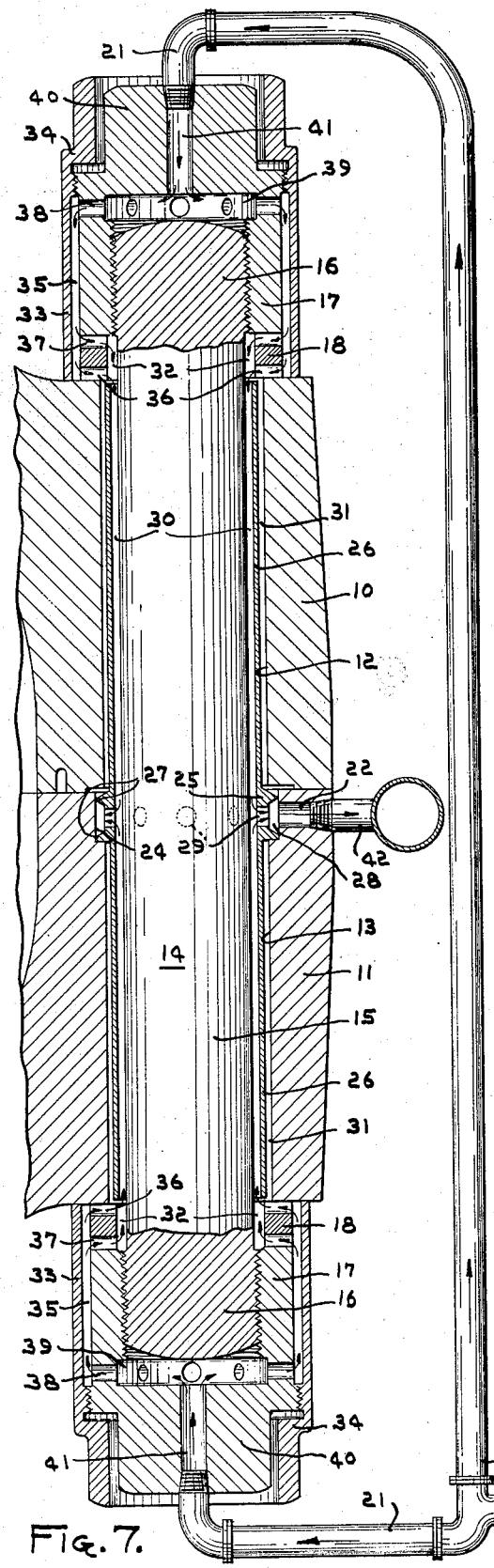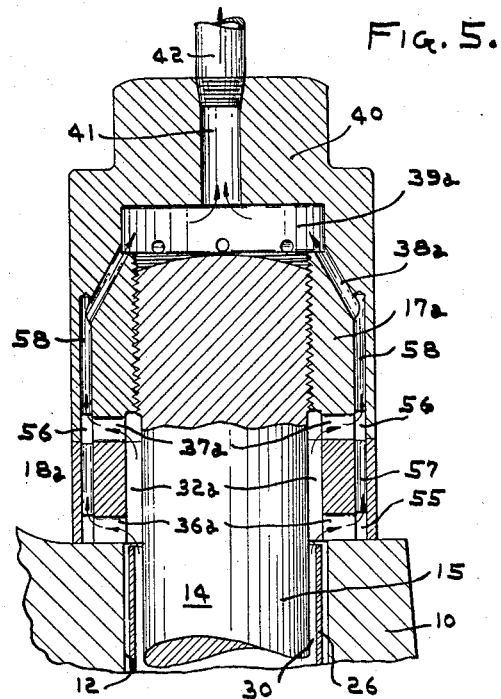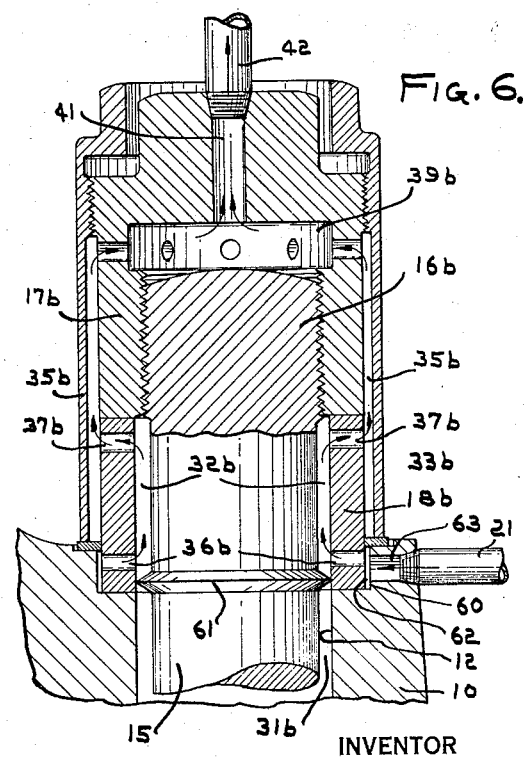

Patented June 1, 1943

2,320,398

UNITED STATES PATENT OFFICE 2,320,398

COOLING HIGH TEMPERATURE BOLTING

Eric A. Zetterquist, Drexel Hill, Pa., assignor to Westinghouse Electric & Manufacturing Company, East Pittsburgh, Pa., a corporation of Pennsylvania Application August 30, 1941, Serial No. 409,108

15 Claims. (Cl. 189—36)

This invention relates to elastic-fluid turbine cylinders and the like and it has for an object to provide an arrangement of the structure thereof and of its bolting such that a cooling medium may be circulated to absorb heat in order that the flow of heat to the bolting may be reduced or minimized and the bolting thereby be rendered effective to hold the parts of the cylinder, or its equivalent, in pressure-tight relation under high-temperature conditions.

It has heretofore been proposed to cool bolts used to hold together turbine cylinder flanges and the like, subject normally to high temperatures, by the use of hollow bolts through which cooling medium is passed. Stress conditions limit the bolt bore diameter and consequently limit the cooling effect. Furthermore, the straight-through flow provided by the ordinary hollow bolt has the objection of a much higher temperature of the cooling medium at the exit end. As there is a clearance space about each bolt and as such space is necessarily filled with stagnant gas, very little heat is transmitted thereacross from the flanges to the bolt, more of the heat being conducted from the flanges, through compressively-engaged parts, to the bolts. I take advantage of these circumstances and provide for cooling of the compressively-engaged parts, or nut assemblies and preferably utilize the space between each bolt opening wall and the bolt shank to impede the flow of heat from the flanges to the bolt. Also, the cooling arrangement readily provides for flow in opposite directions, with the result that more uniform bolt temperatures are possible. More particularly, therefore, a further object of the invention is to provide a construction having these advantageous features.

A further object of the invention is to provide means for cooling the nut assemblies of cylinder bolting in order to reduce the passage of heat from cylinder flanges to the bolting.

A more particular object of the invention is to provide for bolt cooling wherein the cooling medium divides and flows in opposite directions in each bolt to provide for a more uniform bolt temperature.

These and other objects are effected by the invention as will be apparent from the following description and claims taken in connection with the accompanying drawings, forming a part of this application, in which:

Fig. 5 shows a further modification of the construction of Fig. 1;

Fig. 6 is a detail sectional view of a modified nut assembly;

Fig. 7 is a detail view showing the flow of cooling medium reversed; and

Figure 1:
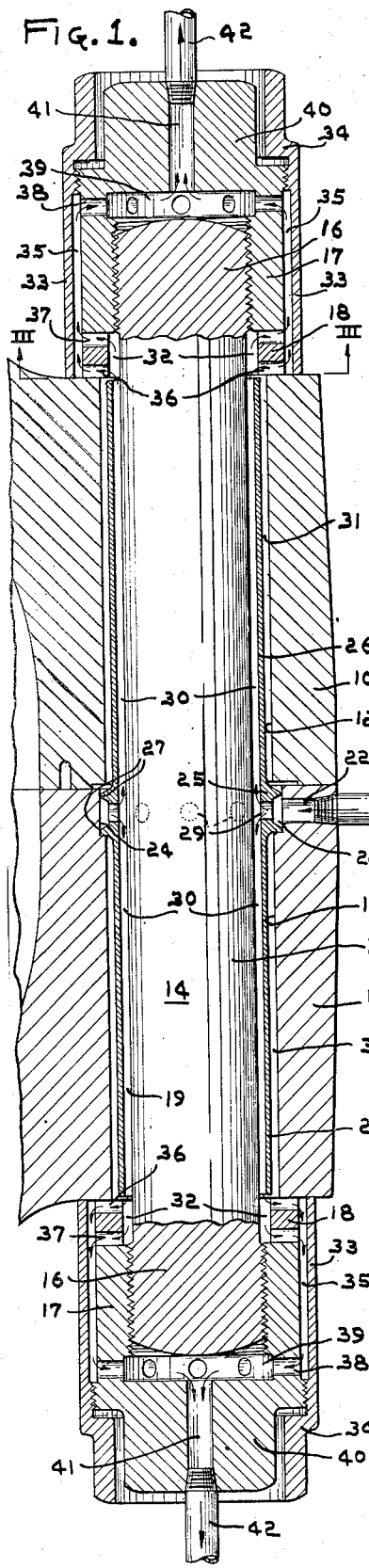
Fig. 1 is a detail sectional view showing the improved bolting applied to cylinder flanges.

In the drawings, there is shown a turbine cylinder having mating upper and lower flanges 10 and 11 provided with aligned bolt openings 12 and 13 for the bolts, at 14, holding the flanges together in pressure-tight relation.

As shown, each of the bolts, at 14, includes a shank 15 having threaded ends 16 with which cooperate nut assemblies, comprising the nuts 17 and the washers 18, for exerting compression on the flanges so that the shanks 15 are effective in tension to hold the flanges together in pressure-tight relation. The clearance spaces or chambers 19 between the bolt shanks and the walls of the aligned openings 12 and 13 are closed at the ends by the nut assemblies.

Figure 2:
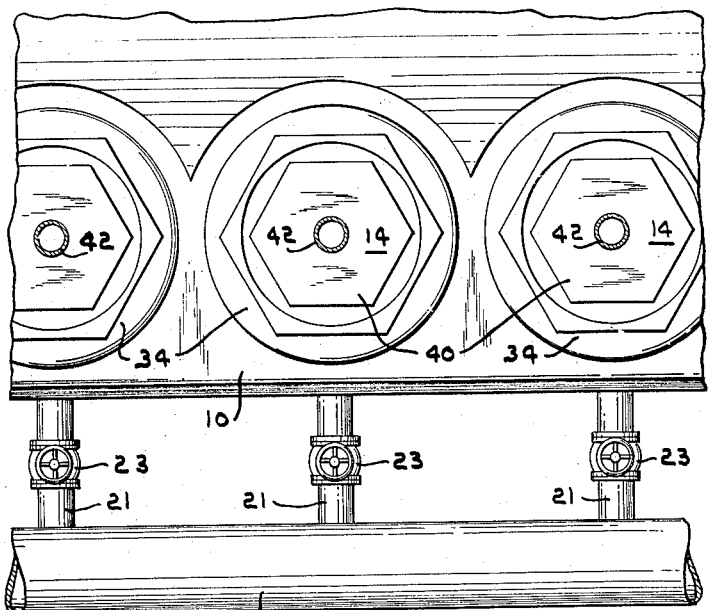
Fig. 2 is a fragmentary plan view of structures shown in Fig. 1.
Figure 3:
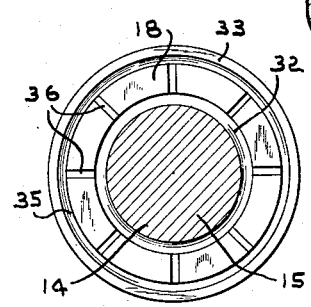
Fig. 3 is a sectional view taken along the line III—III of Fig. 1.

In Figs. 1, 2, and 3, the clearance chambers 19 are utilized as a part of the means for circulating cooling medium about the bolt shanks and through suitable cooling openings or passages formed in the nut assemblies. Cooling medium is supplied from the header 20 and branch passages 21 to drilled openings 22 formed in one of the flanges and communicating with its bolt openings, the branch conduits 21 each preferably being provided with an adjusting valve 23.

In Fig. 1, the lower flange 11 has its openings 13 each counterbored at 24 to receive tightly the lantern portion 25 of the tubular baffle 26 disposed in the chamber 19, each portion 25 having annular ribs 27 tightly fitting its counterbore and defining an annular distributing chamber 28 in communication with the associated supply opening 22, the lantern openings 29 providing for flow of fluid from the chamber to the space 30 of annular section between the bolt shank 15 and the interior of the tubular baffle 26, the entering fluid flowing in opposite directions toward the nut assemblies at the bolt ends. The baffle 26 not only provides a flow path of uniform area and one in which velocity of cooling medium adequate for heat dissipation is secured, but it also cooperates with the bolt opening walls to define stagnant or dead gas spaces 31 resisting transfer of heat from the flanges to the bolts.

Each washer 18 has its opening somewhat larger than that of the bolt shank so as to provide an annular space 32 in open communication with the passage or space 30. The nut 17 has an outer skirt or cup flange 33, preferably provided by the cup 34 attached to the nut, tightly engaging the flange to provide a longitudinally-extending space or passage 35. The communicating spaces 30 and 32 are connected in parallel to the space 35 by radially-extending passages 36 and 37 arranged circumferentially of the nut assembly. After flowing longitudinally along the passage 35, fluid enters the circumferential series of radially-arranged passages 38 and is discharged therefrom into the chamber 39 formed between the end of the bolt shank and the cover portion 40 of the cap nut 17, the cover portion having a discharge opening 41. The discharge openings 41 are connected to suitable discharge conduits 42 extending to the outside of the turbine cylinder lagging jacket, where air is used as the cooling medium, or to a receiver header, where steam is used.

The passages 36 and 37 are arranged close to the flanges and they are therefore highly effective to reduce the transfer of heat, through the contact surfaces, from the flanges to the nut assemblies. Preferably, the openings 36 are formed by slots provided in the side of the washer or extension ring 18 adjacent to the flange and the openings 37 are provided by slots formed either in the washer 18 or in the cap nut 17. The amount of cooling surface may be increased by making the slots deeper, washers or extension rings of suitable thickness being provided.

From the structure so far described, it will be apparent that heat flowing from the flanges to each bolt is reduced due to several features constraining the cooling medium to act effectively. First of all, the tubular baffle 26 and the bolt shank provide a passage whose flow area is uniform and sufficiently restricted to give adequate cooling medium velocity, and it cooperates with the flange opening walls to provide the stagnant or dead gas space or spaces 31. The radial passages 36 and 37 of the nut assemblies disposed adjacent to the flanges assure of the cooling medium absorbing heat to the best advantage. Cooling medium passing along the passages or jacket spaces 35 about the body or threaded portions of the nuts is further effective to absorb heat, and additional heat absorption of heat occurs in the spaces 39 before the cooling medium is discharged. Furthermore, heat is dissipated in such a manner that more uniform bolt temperatures are assured, this being due to the provision for parallel flow of air through each nut assembly and in opposite directions with respect to each bolt shank.

Figure 4:
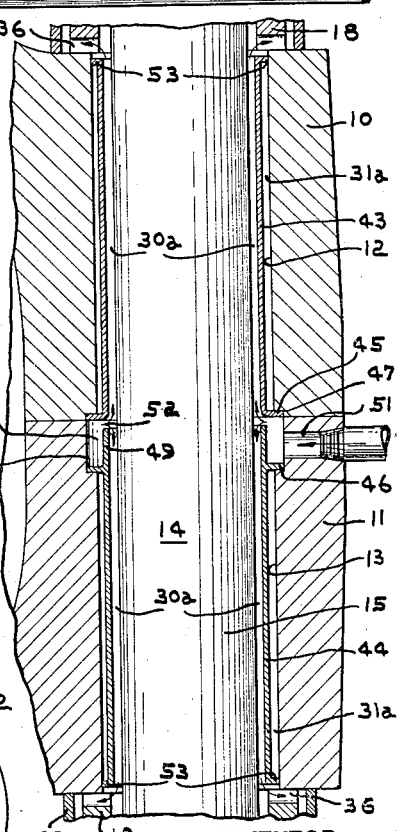
Fig. 4 is a view showing a modified arrangement of Fig. 1.

In Fig. 4, instead of a single baffle 26 for each pair of aligned bolt openings, each flange is equipped with a baffle, the upper and lower flange openings 12 and 13 being provided with baffles 43 and 44. The adjacent ends of the baffles have flanges 45 and 46 fitting closely within the counterbores 47 and 48 formed at the adjacent ends of the openings 12 and 13 and the lower baffle has an extension 49 beyond the flange 46 and providing a distributing chamber 50 for cooling medium supplied thereto by the passage 51 formed in the lower flange 11. From the distributing chamber, cooling medium passes through the annular opening or orifice 52 and flows therefrom in opposite directions along the space 30a to the terminal nut assemblies. The dead or stagnant gas spaces 31a are more effective in that they are closed at their outer ends by flanges 53 provided at the outer ends of the baffles.

In Fig. 5, the nut assembly is modified. Instead of a separate nut cap, as in Fig. 1, this structure is provided by integral portions of the washer or extension ring and of the nut. To this end, the nut 17a and the washer 18a have deep annular grooves 55 and 56 with which the radially-arranged passages 36a and 37a communicate, and the washer and nut have drilled openings 57 and 58, respectively, providing for flow of cooling medium along the nut assembly and through the radially-arranged passages 38a to the chamber 39a.

In Fig. 6, the flow of cooling medium is restricted to the nut assemblies. The flanges 10 and 11 have counterbores 60 at the outer ends of the bolt openings and the bolt shanks 15 have annular ribs 61 near to the bottoms of the counterbores. The washer or extension ring 18b of each nut assembly fits closely about and is centered by the adjacent rib 61 and it bears against the bottom of the counterbore, the periphery of the washer or ring being spaced inwardly from the counterbore wall to form an annular chamber 62. The ribs 61 and the extension rings or washers also cooperate to close the ends of the dead or stagnant gas spaces 31b. Cooling medium supplied by the flange bores 63 to the chambers 62 flows from the latter through the radially-arranged passages 36b to the annular spaces 32b between the bolt shanks and the washers or extension rings, the passages 36b of each washer or extension ring being sufficiently numerous and located sufficiently close to the contact surfaces of the flange and the extension ring or washer that cooling medium flowing therethrough is effective to absorb a considerable portion of the heat which would otherwise flow through such contact surfaces to the bolt. Fluid flows along each space 32b and is discharged through the radially-arranged passages 37b, the fluid so flowing further absorbing heat from the nut assembly. Fluid discharged from the passages 37b enters the space 35b encompassing the threaded portion of the nut 17b and is discharged therefrom to the chamber 39b, as already described.

Fig. 7 shows an arrangement similar to Fig. 1, except that the flow of cooling medium is reversed, the cooling medium entering the nut assemblies and being discharged from suitable flange openings or bores. This arrangement has the advantage of producing a greater temperature difference between the bolt and the cooling medium where the maximum contact area occurs.

Figure 8:
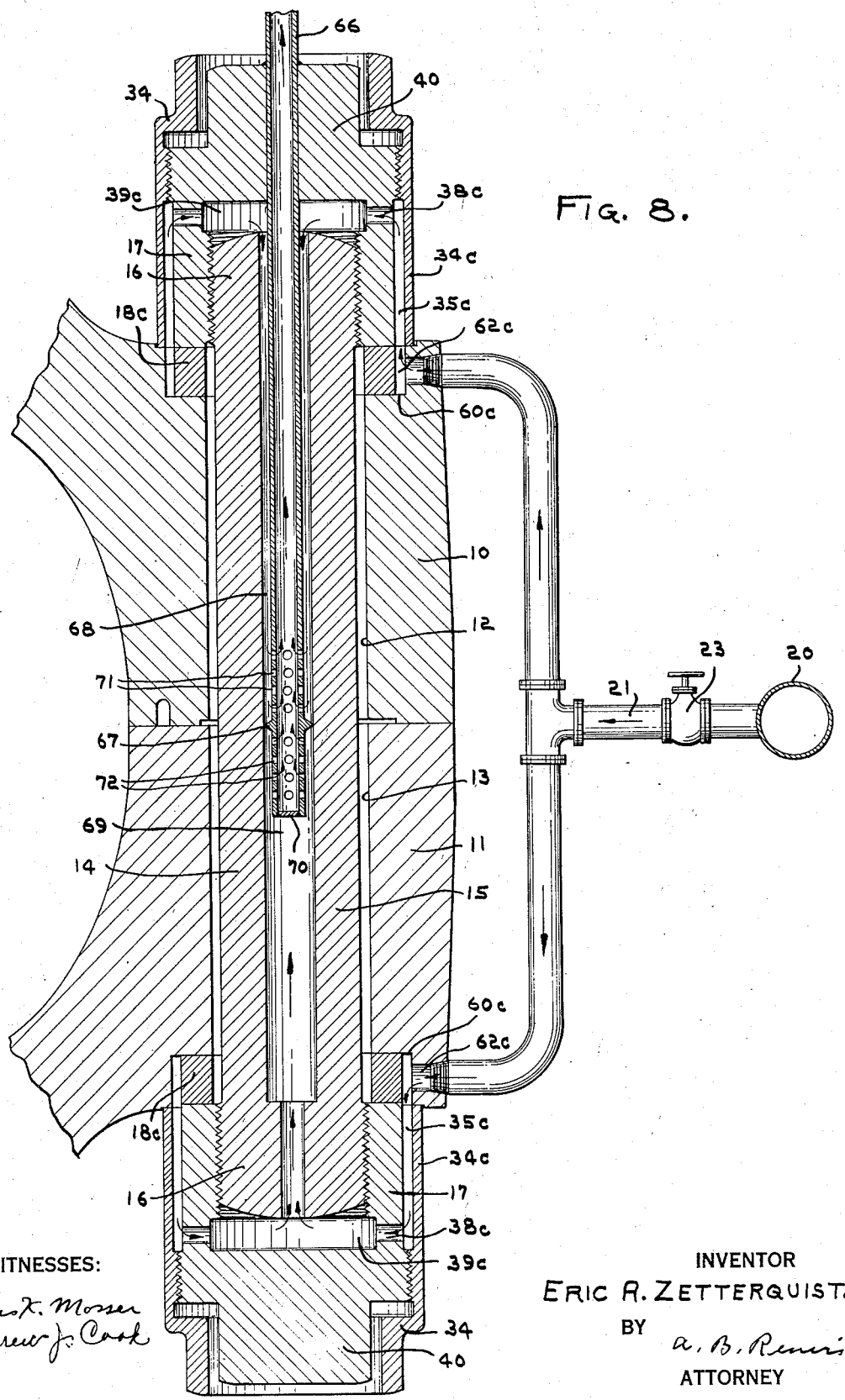
Fig. 8 is a detail sectional view showing a further modification.

In Fig. 8, the nut assemblies having cooling passages are shown in connection with a hollow bolt. The bolt openings 12 and 13 have counterbores 60c at their outer ends, somewhat like Fig. 6, and the spacing rings or washers 18c define, with respect to the counterbore walls, annular spaces which are covered by the nut caps 34c, thereby forming chambers 62c connected by the annular spaces or passages 35c, embracing the threaded portions of the nuts proper, to the radially-arranged passages 38c, the latter passages having their exit ends communicating with the chambers 39c. The chambers 39c of each bolt communicate with the ends of the bore of the latter. An outlet tube 66 is carried by one of the nut assemblies and it has an outer annular rib 67 having a sliding fit with respect to the interior of the bolt bore, the rib 67 being located so as to divide the interior of the bolt bore approximately midway of the length of the bolt shank so as to provide bore chambers 68 and 69. The inner end of the tube is closed, as shown at 70, and flow from the bore chambers 68 and 69 to the interior of the tube 66 is restricted to the openings 71 and 72, thereby assuring, not only of distributed flow to the nut assemblies of each bolt, but also of uniform and distributed flow along the bore.

The arrangement shown in Fig. 8 for hollow bolts has the advantage over prior hollow bolt constructions in that a more uniform temperature is provided for the reason that cooling medium is supplied to opposite ends of each bolt and removed substantially midway of the length of the bolt. If the flow of cooling medium should be reversed, then such medium would be discharged from the nut assemblies, in which case the ends of the bolt would still be subject to uniform temperature conditions. Furthermore, by providing for cooling of the nut assemblies, it is assured that cooling is effected where most needed, that is, adjacent to the contact surfaces of the nut assemblies and flanges where the greatest flow of heat from the flanges to the bolts ordinarily occurs.

From the foregoing, it will be apparent that the flow of cooling medium for each bolt is directed so as to secure a more uniform bolt temperature, that is, the large differential of inlet and exit end temperatures inherent in the ordinary straight-through hollow bolt is avoided. By providing for cooling of the nut assemblies, the cooling medium is used where it is most effective to impede the transfer of heat from the flanges to the bolts. The provision of baffles in the bolt openings assures of cooling medium flow at adequate velocity in direct contact with the bolt shanks and the baffle interior surfaces, thereby opposing heat transfer from the flanges and across the bolt opening spaces to the bolts, and the baffles are so arranged as to improve the insulating effect inherent in dead or stagnant gas spaces between the ordinary cylinder bolt openings and bolts.

Furthermore, as disclosed and claimed in application Serial No. 416,178, filed October 23, 1941, and assigned to the assignee of the present application, each bolt has its own cooling medium supply conduit provided with a valve. The valves are adjusted to obtain a desired bolt temperature reduction, that is, to limit the bolt temperature; and, in case of a leak, increased flow of cooling medium to the bolts in the region of the leak may be effected by suitable valve adjustment in order to exert additional pressure on the flanges.

While I have shown the invention in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. A joint comprising compressively-engaged parts subject to being heated and having aligned bolt openings, bolts in the openings, each bolt including a shank having a threaded portion and a nut assembly cooperating with the threaded portion and engaging one of said parts, each nut assembly including a cap nut and a spacing ring, said cap nut cooperating with the associated shank end to define a chamber, means providing a passageway for each bolt, each nut assembly having passageways communicating with its chamber and with the associated bolt passageway, said nut assembly passageways including longitudinally and radially-extending portions and the radially-extending portions communicating with the chamber, and means providing for flow of cooling medium through said communicating passageways and chamber.

2. A joint comprising compressively-engaged parts subject to being heated and having aligned bolt openings, bolts in the openings, each bolt including a shank having a threaded portion and a nut assembly cooperating with the threaded portion and engaging one of said parts, each nut assembly including a cap nut and a spacing ring, said cap nut cooperating with the associated shank end to define a chamber, means providing a passageway for each bolt, each nut assembly having passageways communicating with its chamber and with the associated bolt passageway, said nut assembly passageways including first and second radially-extending portions joined by a longitudinally-extending portion and the second radially-extending portions communicating with the chamber, and means providing for flow of cooling medium through the communicating passageways and chamber.

3. A joint comprising compressively-engaged parts subject to being heated and having aligned bolt openings, bolts in the openings, each bolt including a shank having a threaded portion and a nut assembly cooperating with the threaded portion and engaging one of said parts, each nut assembly including a cap nut and a spacing ring, said cap nut cooperating with the associated shank end to define a chamber, means providing a passageway for each bolt, each nut assembly having passageways communicating with its chamber and with the associated bolt passageway, said nut assembly passageways including a circumferential series of radially-extending portions at opposite faces of the spacing ring, and means providing for flow of cooling medium through said communicating passageways and chamber.

4. A joint comprising compressively-engaged parts subject to being heated and having aligned bolt openings, bolts in the openings and defining annular spaces with respect to the walls of the latter, each bolt including a shank having threaded end portions and nut assemblies cooperating with the threaded end portions and engaging said parts, means providing a passageway for each bolt including at least a circumferential portion of its encompassing annular space, each nut assembly having passageways communicating with the associated bolt passageway and including a circumferential series of radially-extending portions arranged adjacent to said parts, and means for supplying cooling medium to the annular space of each bolt passageway for flow through the latter followed by discharge from the nut assembly passageways.

5. A joint comprising compressively-engaged parts subject to being heated and having aligned bolt openings; the openings of at least one of the parts being counterbored; bolts in the openings; each bolt including a shank having a threaded portion and a nut assembly cooperating with the threaded portion and engaging one of said parts; each nut assembly including a cap nut and a spacing ring in the associated counterbore; said cap nut cooperating with the associated shank end to define a chamber; said spacing ring being spaced from its counterbored wall to provide an annular space and the nut assembly cooperating with the counterbored part to cover the annular space in order to provide an annular chamber; means providing a passageway for each bolt; each nut assembly having passageways communicating with the associated bolt passageway and chambers; said nut assembly passageways including radially-extending portions communicating with the first chamber; and means providing for flow of cooling medium through the communicating passageways and chambers.

6. In a joint, a pair of flanges subject to being heated and having pairs of aligned bolt openings, bolts for holding the flanges together in pressure-tight relation and arranged in the openings, each bolt comprising a shank having threaded end portions and nut assemblies cooperating with the latter for compressively engaging the flanges, means providing a passageway for each bolt and including portions formed in a flange each of said nut assemblies having passageways therein communicating with the associated bolt passageway, a first set of conduits connected to the flange portions of the passageways, a second set of conduits connected to the nut assembly passageways, and means for supplying cooling medium to one of the sets of conduits for passage through the communicating passageways followed by discharge from the other set of conduits.

7. In a joint, a pair of flanges subject to being heated and having pairs of aligned openings, bolts for holding the flanges together in pressure-tight relation and arranged in the openings, each bolt comprising a shank having threaded end portions and nut assemblies cooperating with the latter and compressively engaging the flanges, each nut assembly including a cap nut defining a chamber with respect to the adjacent shank end, means providing a passageway for each bolt and including portions formed in a flange, each nut assembly having passageways formed therein and including a passage in encompassing relation with respect to the threaded portion of the nut and connected by a circumferential series of radially-arranged passages to its chamber, a first set of conduits connected to the flange portions of the passageways, a second set of conduits connected to nut assembly passageways, and means for supplying cooling medium for one set of conduits for passage through the communicating passageways and chambers followed by discharge from the other set of conduits.

8. A pressure-tight joint comprising compressively-engaged flanges subject to being heated and having aligned bolt openings; bolts in the openings; each bolt comprising a shank having threaded ends and nut assemblies cooperating with the latter and engaging the flanges; means cooperating with the walls of the openings to provide stagnant air spaces and including tubular elements in each pair of registering openings; means providing a passageway for each bolt and including a passage formed in one of the flanges and communicating with annular spaces between the tubular elements and the shank; each of said nut assemblies having radial passages formed therein and having their inner ends communicating with the annular space portion of the passageway of the associated bolt; and means providing for flow of cooling medium through the communicating passageways.

9. A pressure-tight joint comprising compressively-engaged flanges subject to being heated and having pairs of aligned bolt openings; bolts in the openings; each bolt comprising a shank having threaded ends and nut assemblies cooperating with the latter and engaging the flanges; each nut assembly including a cap nut and a spacing ring and the cap nut cooperating with the adjacent end of the shank to define a chamber; tubular means cooperating with the walls of each pair of aligned openings to provide stagnant gas spaces; means providing a passageway for each bolt and including a passage formed in one of the flanges and communicating with the annular space between the tubular means and the shank; each of said nut assemblies having passages formed therein and communicating with its chamber and with the annular space of the associated bolt; said nut assembly passageways including radial portions disposed adjacent to the contiguous flanges and having their inner ends communicating with said annular spaces; and means providing for flow of cooling medium through the communicating passageways and chambers.

10. In a joint, first and second flanges subject to being treated and having pairs of aligned openings, bolts for holding the flanges together in pressure-tight relation and arranged in said openings, each bolt comprising a shank having threaded end portions and nut assemblies cooperating with the latter for compressively engaging the flanges, tubular baffle means in the pairs of aligned openings and defining annular passages with respect to the bolt shanks and stagnant gas spaces with respect to the walls of the openings, the first flange having passages communicating with said annular passages intermediately of the length of the latter, said nut assemblies having passageways communicating with said annular passages, and means providing for flow of ccoling medium through the communicating passageways including conduits connected to the first flange and to the nut assemblies.

11. In a joint, a pair of flanges subject to being heated and having pairs of aligned openings; bolts for holding the flanges together in pressure-tight relation and arranged in the openings; each bolt comprising a shank having threaded end portions and nut assemblies cooperating with the latter for compressively engaging the flanges; each shank having a bore extending from end-to-end thereof and each nut assembly including a cap nut and defining, with respect to the adjacent shank end, a chamber communicating with the shank bore; a tube carried by one of the nut assemblies of each bolt and arranged in the bore of the shank thereof and communicating with the bore intermediately of the length thereof; means providing a passageway for each bolt and including portions formed in the flanges, and in the shank; each nut assembly having passageways communicating with its chamber and with the associated bolt passageway and including a passage in encompassing relation with respect to the threaded portion of the nut and connected by a circumferential series of radially-arranged passages to the chamber thereof; and means providing for flow of cooling medium through the communicating passageways and chambers.

12. A joint comprising compressively-engaged parts subject to being heated and bolts for holding the parts together, each bolt including a shank having a threaded portion and a nut assembly cooperating with the threaded portion and engaging one of the parts, said parts providing passageways through which the respective bolts extend, said nut assemblies each having passageways formed therein and communicating with the passageway for their bolt, and means providing for the flow of cooling medium through said communicating passageways.

13. A joint comprising compressively-engaged parts subject to being heated and bolts for holding the parts together, each bolt including a shank having a threaded portion and a nut assembly cooperating with the threaded portion and engaging one of the parts, means providing passageways for the respective bolts, said nut assemblies each having passageways formed therein and communicating with their bolt passageway, the passageways of each nut assembly including a passage in encompassing relation with respect to the threaded portion of the assembly, and means providing for the flow of cooling medium through said communicating passageways.

14. A joint comprising compressively-engaged parts subject to being heated and bolts for holding the parts together, each bolt including a shank having a threaded portion and a nut assembly cooperating with the threaded portion and engaging one of the parts, means providing passageways for the respective bolts, said nut assemblies each having passageways formed therein and communicating with their bolt passageway, said nut assembly passageways including a circumferential series of radially-extending passages formed in the assembly and located adjacent to one of said parts, and means providing for the flow of cooling medium through said communicating passageways.

15. A joint comprising compressively-engaged parts subject to being heated and bolts for holding the parts together, each bolt including a shank having a threaded portion and a nut assembly cooperating with the threaded portion and engaging one of the parts, each nut assembly including a cap nut defining a chamber with respect to the adjacent shank, means providing passageways for the respective bolts, said nut assemblies each having passageways communicating with its chamber and with the associated bolt passageway, said nut assembly passageways including a passage in encompassing relation with respect to the threaded portion of the assembly and connected by a circumferential series of radially-arranged passages to the chamber, and means providing for the flow of cooling medium through the communicating passageways and chamber.

ERIC A. ZETTERQUIST.